United States Patent
Hu

(10) Patent No.: US 9,505,282 B2
(45) Date of Patent: Nov. 29, 2016

(54) AMPHIBIOUS FLYING CAR

(71) Applicant: Xinru Hu, Sichuan (CN)

(72) Inventor: Xinru Hu, Sichuan (CN)

(*) Notice: Subject to any disclaimer, the term of this patent is extended or adjusted under 35 U.S.C. 154(b) by 0 days.

(21) Appl. No.: 15/026,103

(22) PCT Filed: Aug. 4, 2014

(86) PCT No.: PCT/CN2014/083646
§ 371 (c)(1),
(2) Date: Mar. 30, 2016

(87) PCT Pub. No.: WO2015/090071
PCT Pub. Date: Jun. 25, 2015

(65) Prior Publication Data
US 2016/0243910 A1  Aug. 25, 2016

(30) Foreign Application Priority Data
Dec. 20, 2013 (CN) .......................... 2013 1 0714318

(51) Int. Cl.
| | |
|---|---|
| *B60F 5/02* | (2006.01) |
| *B60F 3/00* | (2006.01) |
| *B63B 5/24* | (2006.01) |
| *B63H 5/07* | (2006.01) |
| *B64C 3/56* | (2006.01) |
| *B64C 27/26* | (2006.01) |
| *B64C 27/52* | (2006.01) |
| *B64C 37/00* | (2006.01) |

(Continued)

(52) U.S. Cl.
CPC ................. *B60F 5/02* (2013.01); *B60F 3/003* (2013.01); *B63B 5/24* (2013.01); *B63H 5/07* (2013.01); *B64C 3/56* (2013.01); *B64C 27/26* (2013.01); *B64C 27/52* (2013.01); *B64C 37/00* (2013.01); *B64D 27/04* (2013.01); *B64D 41/00* (2013.01); *B63B 2005/245* (2013.01)

(58) Field of Classification Search
CPC ....... B60F 5/02; B64C 37/00; B64C 35/008; B64C 27/26
See application file for complete search history.

(56) References Cited

U.S. PATENT DOCUMENTS 1,848,389 A * 3/1932 Sikorsky ............... B64C 35/008
244/17.11
2,563,731 A * 8/1951 Masterson .............. B64C 37/00
244/2

(Continued)

FOREIGN PATENT DOCUMENTS

| CN | 2237597 Y | 10/1996 |
|---|---|---|
| CN | 1135427 A | 11/1996 |

(Continued)

*Primary Examiner* — Philip J Bonzell
*Assistant Examiner* — Michael Kreiner
(74) *Attorney, Agent, or Firm* — Novick, Kim & Lee, PLLC; Allen Xue

(57) ABSTRACT

The present invention provides an amphibious flying car, comprising: a casing, a chassis, a ship bottom body, a vehicle wheel, a drive system and an operating system; an upper airfoil and a rotor wing which are arranged on the top of the casing, are fixed on a bearing carrier located at the orthocenter of the fuselage; a strake wing is provided at the position where the casing, the chassis and the ship bottom body are combined; the horizontal wing comprises a stabilizing plane and an elevator, which are respectively located at the front end and the rear end of the fuselage; the vertical twin fins are arranged at both sides of the rear end of the fuselage, and its root segments are fixedly connected to the strake wing.

18 Claims, 3 Drawing Sheets

(51) Int. Cl.
*B64D 27/04* (2006.01)
*B64D 41/00* (2006.01)

(56) References Cited

U.S. PATENT DOCUMENTS

| | | | | |
|---|---|---|---|---|
| 2,707,084 A * | 4/1955 | Mills, Jr. | ............... | B64C 37/00 114/273 |
| 2,940,688 A * | 6/1960 | Bland | ............... | B60F 3/00 114/102.16 |
| 3,261,572 A * | 7/1966 | Gorton | ............... | B64C 37/00 244/2 |
| 4,165,846 A * | 8/1979 | Groeger | ............... | B60B 3/048 244/2 |
| 4,579,297 A * | 4/1986 | Ayoola | ............... | B60F 3/00 244/106 |
| 4,589,611 A * | 5/1986 | Ramme | ............... | B64C 27/10 244/12.3 |
| 4,899,954 A * | 2/1990 | Pruszenski, Jr. | ............... | B64C 37/00 244/2 |
| 4,913,375 A * | 4/1990 | Fitzpatrick | ............... | B64C 37/00 114/272 |
| 5,645,250 A * | 7/1997 | Gevers | ............... | B64C 1/00 244/101 |
| 6,086,014 A * | 7/2000 | Bragg, Jr. | ............... | B60F 5/02 244/2 |
| 6,997,413 B2 * | 2/2006 | Wukowitz | ............... | B64C 5/02 244/106 |
| 7,040,573 B2 * | 5/2006 | Selman | ............... | B64C 35/00 244/101 |
| 7,815,144 B2 * | 10/2010 | Molnar | ............... | B62K 13/00 244/17.11 |
| 8,066,229 B2 * | 11/2011 | Hogan | ............... | B64C 1/26 244/219 |
| 8,162,253 B2 * | 4/2012 | Seiford, Sr. | ............... | B60F 5/02 244/7 R |
| 8,177,162 B2 * | 5/2012 | Karkow | ............... | B64C 35/001 244/105 |
| 8,272,596 B2 * | 9/2012 | Meekins | ............... | B64C 25/54 244/101 |
| 9,156,550 B2 * | 10/2015 | Nam | ............... | B64C 37/00 |
| 9,259,984 B2 * | 2/2016 | Brown | ............... | B60F 5/02 |
| 9,315,263 B2 * | 4/2016 | Cacciaguerra | ............... | B64C 25/56 |
| 2002/0125367 A1 * | 9/2002 | Killingsworth | ............... | B60F 3/00 244/17.11 |
| 2002/0195518 A1 * | 12/2002 | Killingsworth | ............... | B60F 3/00 244/7 A |
| 2003/0094536 A1 | 5/2003 | LaBiche | | |
| 2005/0151001 A1 * | 7/2005 | Loper | ............... | B64C 27/14 244/6 |
| 2010/0078526 A1 * | 4/2010 | Mulero Valenzuela | ............... | B64C 27/30 244/7 A |
| 2011/0042507 A1 | 2/2011 | Seiford, Sr. | | |
| 2012/0032023 A1 * | 2/2012 | Bousfield | ............... | B64C 3/56 244/49 |
| 2013/0112804 A1 * | 5/2013 | Zhu | ............... | B64C 29/0025 244/2 |
| 2013/0299632 A1 * | 11/2013 | Herzberger | ............... | B64C 35/006 244/102 R |

FOREIGN PATENT DOCUMENTS

| | | | | |
|---|---|---|---|---|
| CN | 2309970 Y | 3/1999 | | |
| CN | 201195485 Y | 2/2009 | | |
| CN | 101537777 A | 9/2009 | | |
| CN | 102166929 A | 8/2011 | | |
| CN | 102229316 A | 11/2011 | | |
| CN | 202115302 U | 1/2012 | | |
| CN | 102774493 A | 11/2012 | | |
| CN | WO 2013159672 A1 * | 10/2013 | ............... | B60F 5/02 |
| CN | 203623304 U | 6/2016 | | |
| FR | 1236134 A * | 7/1960 | ............... | B60F 5/02 |
| FR | 2610254 A1 * | 8/1988 | ............... | B60F 5/02 |
| WO | WO 9304919 A1 * | 3/1993 | ............... | B60F 5/02 |
| WO | 2010/012285 A2 | 2/2010 | | |

* cited by examiner

AMPHIBIOUS FLYING CAR

FIELD OF THE INVENTION

The present invention relates to the technical field of transportation means, and specifically to a transport vehicle that can travel on the land, on the water and in the sky.

DESCRIPTION OF THE RELATED ART

Existing vehicles mostly can only work in one kind of working area; for example, a car can only travel on the land, a plane can only fly in the sky, and a ship can only sail on the water. With the development of the technology, amphibious vehicle has been widely used in a variety of applications due to its versatility. Even some triphibious vehicles have been proposed, which however have some limitations; for example, they need a runway to take off and land, their trafficability on land is poor, and their speed when sailing on the water is slow, and so on. Nowadays, when dealing with emergencies and disasters and defending the homeland, protecting the human life, property and homeland security has become more and more important; unfortunately, in case of natural disasters and emergencies, no existing vehicle can be a qualified transport vehicle that meets all the demands. In such cases, it's desirable that the transport vehicle is able to reach in a very short time a targeted position, no matter whether such targeted position is located on the water or on the land or in the sky, and no matter how the situations of the traffic, surrounding buildings and natural environment are. The transport vehicle should be able to keep its operational capability even under terrible weather conditions.

Practically, what is badly needed is a vehicle that can travel on the water, on the land and in the sky, and is capable of Short Take-Off and Landing (STOL) and Vertical Take-Off and Landing (VTOL) on land and in water area (or sea area), sky flying, hovering and so on. It's required that such vehicle has expected cubage, has a light overall machine weight, and also has a compact volume. When traveling on the land or sailing in the water area (or sea area), it is demanded that the overall machine weight is heavy, the volume is big, and the power is high; also, the road condition on the land and waves in the water area (or sea area) should be dealt with. Additionally, the car used on land usually has no concern about the position of the orthocenter. Since these main factors bring out technical difficulties that have mutual restrictions, a practical amphibious flying transport vehicle that can be used in every day life is still absent.

SUMMARY OF THE INVENTION

In order to solve above problem, the object of the present invention is to provide an amphibious flying car, which incorporates the generic technologies and existing product components of existing cars, ships and aircrafts, overcomes the problems caused by the differences in the technologies, can rapidly switch the operation mode, and enables traveling in different mediums. Meanwhile, such car satisfies the size requirements of above-mentioned three kinds of vehicles as well as requirements of laws, and is safe, efficient, practical and artistic.

The technical solutions of the present invention are as follows:

An amphibious flying car, comprising: a casing, a chassis, a ship bottom body, a vehicle wheel, a drive system and an operating system; wherein the casing is fixedly arranged on the chassis; an upper airfoil 6 and a rotor wing, which are arranged on the top of the casing, are fixed on a bearing carrier located at the orthocenter of the fuselage; the upper airfoil is hinged to the casing via a hinged shaft; the chassis is connected with the ship bottom body; a strake wing is provided at the position where the casing, the chassis and the ship bottom body are combined; the horizontal wing comprises a stabilizing plane and an elevator, which are respectively located at the front end and the rear end of the fuselage; the vertical twin fins are arranged at both sides of the rear end of the fuselage, and its root segments are fixedly connected to the strake wing; the automobile engine is arranged in the front of the chassis, and is connected to the vehicle wheel and the thruster by means of a drive system; the water rudder and the thruster are arranged under the chassis and at the rear of the fuselage; the aero-engine is arranged at the rear end of the fuselage, and is connected to the rotor wing by means of the drive system; the operating system comprises a hydraulic rigid mechanical operating system and a quasi-active control system.

Said casing, the chassis and the ship bottom body are all integrated pieces that is composed of carbon fiber reinforced composites and light alloy components; and those three are connected by sealing glue, and the connection position is provided with the strake wing, on the top of which is provided with an outer hook.

Said aero-engine is a turbocharged common rail injection diesel engine.

Said upper airfoil comprises a leading edge flap, an aileron, a trailing edge flap and a navigation light.

Under the control of the hydraulic rigid mechanical operating system, the rotation shaft of said rotor wing tilts backwards within a region of 30"-3°.

The vertical twin fins at both sides of the rear end of the fuselage respectively tilt outwards at a degree of 3°, and are provided with a rudder and a navigation light.

A coupler is arranged between the drive system of said automobile engine and the drive system of the aero-engine.

A front face of said casing is provided with an air inlet of the automobile engine, and a rear portion of a side face of the casing is provided with an inlet passage of the aero-engine.

Said operating system also comprises a navigation system, a communication system and/or a positioning system.

The chassis of said amphibious flying car is also provided with an emergency sheltering device; said emergency sheltering device comprises a storage battery and a motor, the storage battery is electrically connected to the motor, and the motor is connected to the drive system of the amphibious flying car.

The amphibious flying car of the present invention incorporates the generic technologies and existing product components of existing cars, ships and aircrafts. By means of analyzing the differences in the technologies, the amphibious flying car of the present invention installs two kinds of engines respectively in the front and in the rear, so that the overall mass distribution is more balanced, and that the orthocenter of the whole appliance coincides with the center of the rotation shaft of the rotor wing, thus enabling vertical take-off and landing. The appliance body employs carbon fiber reinforced composites and light alloy components, thus it is guaranteed that the casing of the whole appliance is light, the capacity design value is maximized, the contour configuration is compact, and the effective power of the engine is maximized. Since the strake wing provided at the position where the casing, the chassis and the ship bottom body are combined, it is guaranteed that the sailing in the water area (or sea area) is stable. The strake wing is also provided with an outer hook, for carrying different subjects when performing different tasks. Since the top is provided with the upper airfoil and the rotor wing, which can be collapsed and folded, when starting the automobile engine (or meanwhile starting the aero-engine), it can travel on the land like an off-road vehicle, sails on the water like a ship, is capable of take-off and landing by means of a short-distance taxing on the land or on the water, and is capable of vertical take-off and landing as well as hovering. It can quickly switch the operation mode among water sailing, land traveling and sky flying, and enables traveling in different mediums. The present invention essentially changes the delivering manner of personnel and supplies, is capable of reaching a specific objective destination very quickly no matter whether such targeted position is located on the water or on the land or in the sky, and obviously improve the delivering efficiency.

In the Figures: 1—the automobile engine, 2—the operating system, 3—the casing, 4—the coupler, 5—the rotor wing, 6—the upper airfoil, 7—the vertical twin fin, 8—the aero-engine, 9—the elevator, 10—the strake wing, 11—the vehicle wheel, 12—the chassis, 13—the stabilizing plane, 14—the ship bottom body, 15—the water rudder, 16—the thruster, 17—the rudder, 18—the inlet passage of the aero-engine, 19—the air inlet of the automobile engine, 20—the navigation light, 21—the emergency sheltering device.

DETAILED DESCRIPTION OF THE PREFERRED EMBODIMENTS

In the following, the present invention will be explained in more detail in combination with the Figures.

Figure 1:
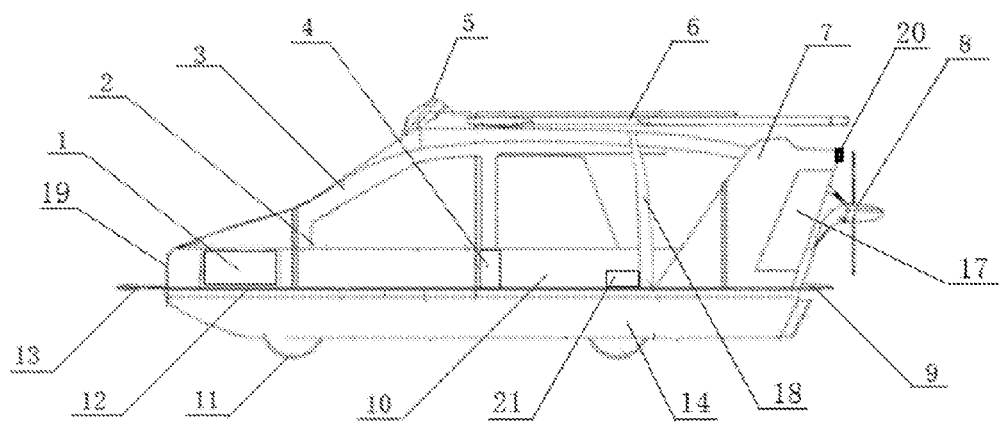
FIG. 1 is an overall main diagram of the present invention.
Figure 2:
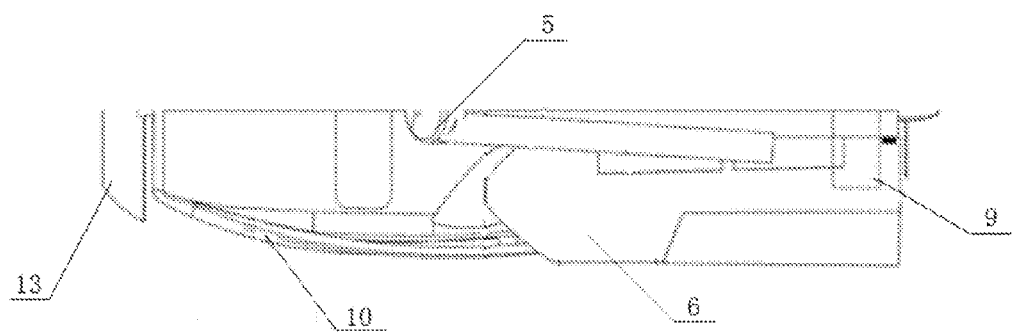
FIG. 2 is top schematic view of FIG. 1 (only one half of the symmetric structure is shown)
Figure 3:
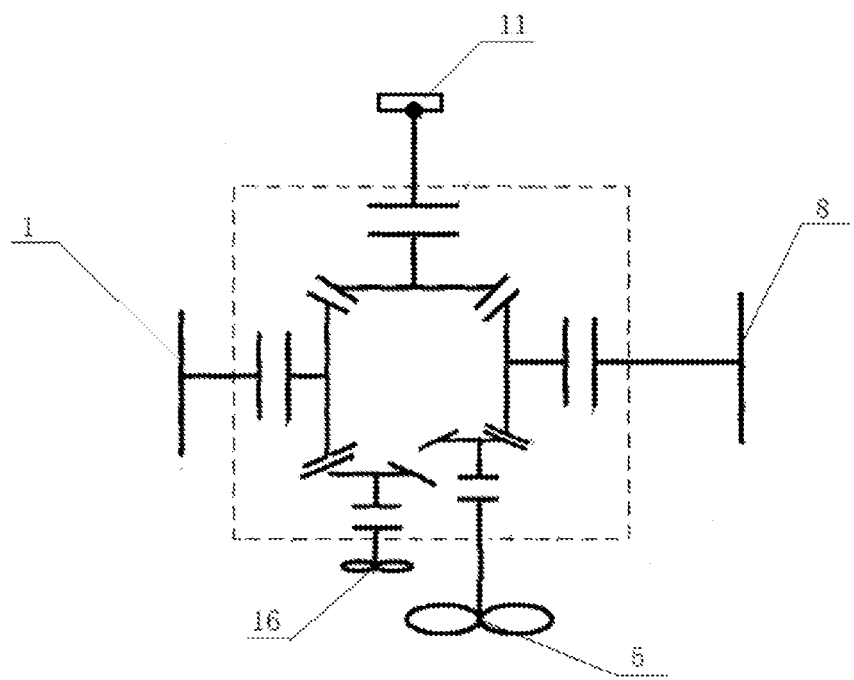
FIG. 3 is a diagram explaining the driving principle of the present invention.

As shown in FIGS. 1, 2 and 3, the present invention provides an amphibious flying car, which comprises a casing 3, a chassis 12, a ship bottom body 14, a vehicle wheel 11, a drive system and the operating system 2; wherein the casing 3 is fixedly arranged on the chassis 12; an upper airfoil 6 and a rotor wing 5, which are arranged on the top of the casing 3, are fixed on a bearing carrier located at the orthocenter of the fuselage; the upper airfoil 6 is hinged to the casing 3 via a hinged shaft; the chassis 12 is connected with the ship bottom body 14; a strake wing 10 is provided at the position where the casing 3, the chassis 12 and the ship bottom body 14 are combined; the horizontal wing comprises a stabilizing plane 13 and an elevator 9, which are respectively located at the front end and the rear end of the fuselage; the vertical twin fins 7 are arranged at both sides of the rear end of the fuselage, and its root segments are fixedly connected to the strake wing 10; the automobile engine 1 is arranged in the front of the chassis 12, and is connected to the vehicle wheel 11 and the thruster 16 by means of a drive system; the water rudder 15 and the thruster 16 are arranged under the chassis 12 and at the rear of the fuselage; the aero-engine 8 is arranged at the rear end of the fuselage, and is connected to the rotor wing 5 by means of the drive system; the operating system 2 comprises a hydraulic rigid mechanical operating system and a quasi-active control system.

Preferably, the casing 3, the chassis 12 and the ship bottom body 14 are all integrated pieces that is composed of carbon fiber reinforced composites and light alloy components; and those three are connected by sealing glue, and the connection position is provided with the strake wing, on the top of which is provided with an outer hook. The structure of such composite material has a short production cycle, has good air-tightness property, is antiseptic, has invisibility property, lightens the whole weight of the car body, and increases the payload of the amphibious flying car. The outer hook of the strake wing is used for carrying different subjects when performing different tasks.

Preferably, the aero-engine 8 is a turbocharged common rail injection diesel engine, which has a high efficiency, can burn adequately, and saves the burning cost.

Preferably, the upper airfoil 6 comprises a leading edge flap, an aileron, a trailing edge flap and a navigation light. During taking off and landing, the elevating force can be enhanced. Also, the taxi distance during taking off and landing can be reduced.

Preferably, under the control of the hydraulic rigid mechanical operating system, the rotation shaft of said rotor wing 5 tilts backwards within a region of 30'-3°. By changing angles of forward inclination and backward inclination of the shaft of the rotor wing, the angle of backward inclination of the rotor wing is changed so as to control the ascent and descent. Even if the engine malfunctions, the whole appliance can still keep its inertial progress, and can land by the spinning of the rotor wing.

Preferably, the vertical twin fins 7 at both sides of the rear end of the fuselage respectively tilt outwards at a degree of 3°, and are provided with a rudder 17 and a navigation light 20. The adequate navigation direction stability is guaranteed when flying in the sky at a high speed.

Preferably, a coupler 4 is arranged between the drive system of said automobile engine 1 and the drive system of the aero-engine 8. According to the working situation, the coupler 4 is selectively coupled or decoupled. Under a coupled state, the impetus of the whole appliance is enhanced. When decoupled, fuel oil consumed by the whole appliance is saved.

Preferably, a front face of said casing 3 is provided with an air inlet 19 of the automobile engine, and a rear portion of a side face of the casing 3 is provided with an inlet passage 18 of the aero-engine. Those two engines are respectively provided with an air inlet passage, thus guaranteeing the normal operation of the engines within different mediums.

Preferably, the operating system 2 also comprises a navigation system, a communication system and/or a positioning system, so as to facilitate the cooperation, thus enabling the capability of reaching the destination more quickly.

Preferably, the chassis 12 of said amphibious flying car is also provided with an emergency sheltering device 21; said emergency sheltering device 21 comprises a storage battery and a motor, the storage battery is electrically connected to the motor, and the motor is connected to the drive system of the amphibious flying car. When the machine halts or the engine malfunctions, the emergency sheltering device is started, the flying can continue or emergency landing can be enabled, thus improving the safety during the flight.

Figure 4:
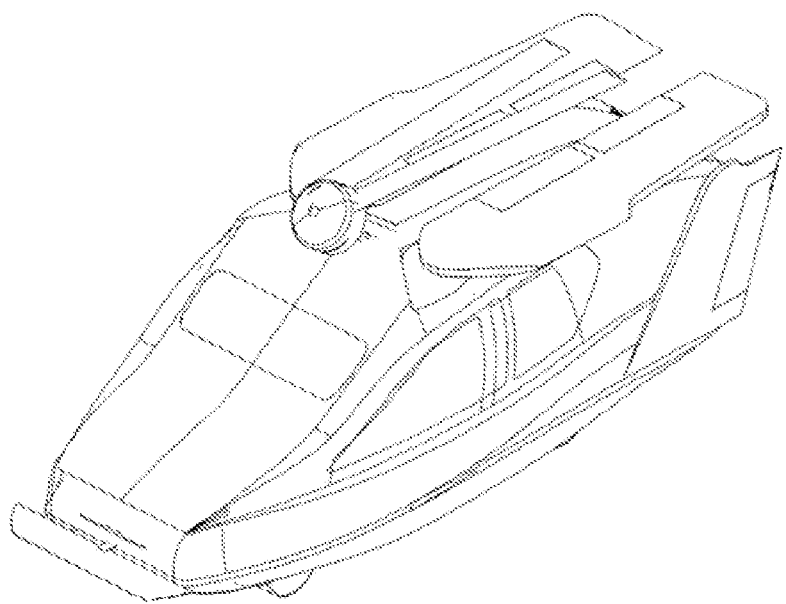
FIG. 4 is a diagram showing a state of the present invention when traveling on land.

As shown in FIG. 4, when traveling on the land, by means of the hydraulic rigid mechanical operating system of the operating system 2, the moving mode and the conversion device are firstly locked, and then the upper airfoil 6 backwards moves around the hinged shaft, close to the casing 3, into a horizontal posture, and the rotor wing 5 backwards moves and gets folded, thus abutting the top of the casing 3. The automobile engine 1 is started and/or the aero-engine 8 is started according to the traffic situation. Then, it can travel like a off-road vehicle.

Figure 5:
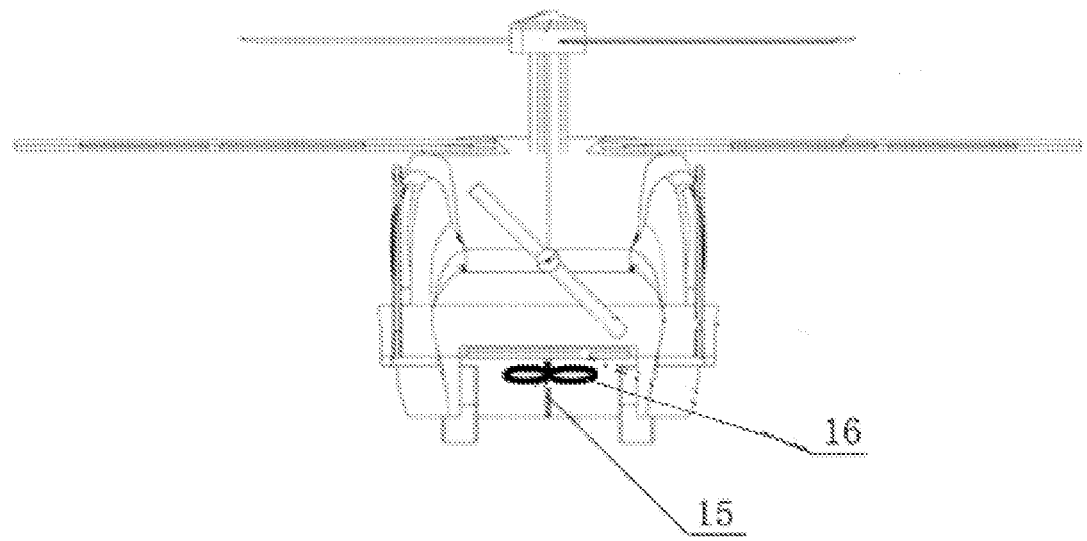
FIG. 5 is a rear view showing a state of the present invention when sailing on the water.

As shown in FIG. 5, when sailing on the water, by means of the hydraulic rigid mechanical operating system of the operating system 2, the moving mode and the conversion device are firstly locked, the upper airfoil 6 spreads around the hinged shaft, the rotor wing 5 restores and is opened. According to weight load, the automobile engine 1 is started and/or the aero-engine 8 is started, and the water rudder 15 and the thruster 16 are controlled by the operating system 2. Then, it can sail like a ship. Spread upper airfoil 6 can improve the buoyancy force when the amphibious flying car sails on the water. If the load is too heavy, the rotor wing 5 can be forced into working state, thus further improving the buoyancy force when the amphibious flying car sails on the water.

Figure 6:
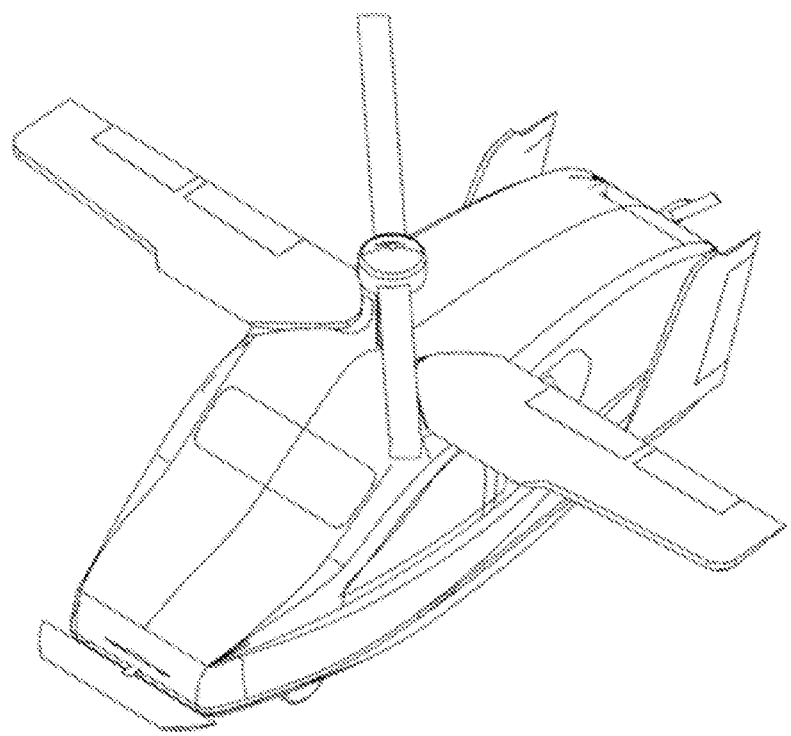
FIG. 6 is a diagram showing a state of the present invention when flying in the sky.

As shown in FIG. 6, when flying in the sky, by means of the hydraulic rigid mechanical operating system of the operating system 2, the moving mode and the conversion device are firstly locked, the upper airfoil 6 spreads around the hinged shaft, the rotor wing 5 restores and is opened. According to the natural environment, the automobile engine 1 is started and the aero-engine 8 is started, and the coupler 4 between their drive systems is coupled. The quasi-active control system of the operating system 2 is used to control the rudder 17, the elevator 9 and the stabilizing plane 13. Under the act of the upper airfoil 6 and the rotor wing 5, take-off and landing can realized by means of a short-distance taxing on the land, and hovering can realized. In case that there is no runway, it's possible that only the aero-engine 8 is used, the rotor wing 5 is driven by the drive system, thus enabling Vertical Take-Off and Landing as well as flying in the sky. For example, when encountering a swamp area, a barrier-free pass and even hovering can be realized by means of the rotor wing.

When there is a barrier on the land so that the travel cannot continue, for example, when a bridge ruptures or when a tunnel collapse, a Vertical Take-Off can be performed by means of the rotor wing 5, and the barrier is got over.

The present invention incorporates the generic technologies and existing product components of existing cars, ships and aircrafts, overcomes the problems caused by the differences in the technologies, can rapidly switch the operation mode, and enables traveling in different mediums. Meanwhile, such car satisfies the size requirements of above-mentioned three kinds of vehicles as well as requirements of laws, and is safe, efficient, practical and artistic. The present invention essentially changes the delivering manner of personnel and supplies, is capable of reaching a specific objective destination very quickly no matter whether such targeted position is located on the water or on the land or in the sky, and obviously improve the delivering efficiency. Especially, the present invention obviously improve the working efficiency, when dealing with emergencies and disasters and defending the homeland.

Of course, the present invention still has many other embodiments. Corresponding various alternatives and modifications can be made by a person skilled in the art based on the present invention, without departing from the spirit and principle of the present invention. However, such corresponding alternatives and modifications all fall into the scope of protection of the present invention defined by the accompany claims.

INDUSTRIAL APPLICABILITY

The present invention incorporates the generic technologies and existing product components of existing cars, ships and aircrafts, overcomes the problems caused by the differences in the technologies, and enables traveling in different mediums (i.e. on the water, on the land and in the sky). Meanwhile, such car satisfies the size requirements of above-mentioned three kinds of vehicles as well as requirements of laws, and is safe, efficient, practical and artistic. What are obvious and self-evident are the advantages of such car as being used in business applications such as entertainment, business travel, emergency service, commuting and tourism, as well as various applications such as infrastructure, logistics and long-distance mixed-section delivery.

The invention claimed is:

1. An amphibious flying car, comprising: a casing (3), a chassis (12), a ship bottom body (14), a vehicle wheel (11), an automotive engine (1), a drive system of the automotive engine (1), an aero-engine (8), a drive system of the aero-engine (8), a fuselage, and an operating system (2); characterized in that: the casing (3) is fixedly arranged on the chassis (12); an upper airfoil (6) and a rotor wing (5), which are arranged on the top of the casing (3), are affixed to a bearing carrier located at a orthocenter of the fuselage; the upper airfoil (6) is affixed to the casing (3) via a hinged shaft; the chassis (12) is connected with the ship bottom body (14); a strake wing (10) is provided at a position where the casing (3), the chassis (12) and the ship bottom body (14) are connected; a horizontal wing comprises a stabilizing plane (13) located at the front end of the fuselage and an elevator (9) located at the rear end of the fuselage; two vertical fins (7) are arranged the rear end of the fuselage, each having its root segment fixedly connected to the strake wing (10); the automobile engine (1) is arranged in the front of the chassis (12), and is connected to the vehicle wheel (11) and a thruster (16) by means of the drive system of the automobile engine (1); a water rudder (15) and the thruster (16) are arranged under the chassis (12) and at the rear of the fuselage; the aero-engine (8) is arranged at the rear end of the fuselage and is connected to the rotor wing (5) by means of the drive system of the aero-engine (8); the operating system (2) comprises a hydraulic rigid mechanical operating system and a quasi-active control system.

2. The amphibious flying car according to claim 1, characterized in that: each of said casing (3), the chassis (12) and the ship bottom body (14) are composed of carbon fiber reinforced composites and light alloy components integrated together; and said casing (3), the chassis (12) and the ship bottom body (14) are connected by a sealing glue.

3. The amphibious flying car according to claim 2, characterized in that: the chassis (12) of said amphibious flying car is further provided with an emergency sheltering device (21); said emergency sheltering device (21) comprises a storage battery and a motor, the storage battery is electrically connected to a motor.

4. The amphibious flying car according to claim 1, characterized in that: said aero-engine (8) is a turbocharged common rail injection diesel engine.

5. The amphibious flying car according to claim 4, characterized in that: the chassis (12) of said amphibious flying car is further provided with an emergency sheltering device (21); said emergency sheltering device (21) comprises a storage battery and a motor, the storage battery is electrically connected to a motor.

6. The amphibious flying car according to claim 1, characterized in that: said upper airfoil (6) comprises a leading edge flap, an aileron, and a trailing edge flap.

7. The amphibious flying car according to claim 6, characterized in that: the chassis (12) of said amphibious flying car is further provided with an emergency sheltering device (21); said emergency sheltering device (21) comprises a storage battery and a motor, the storage battery is electrically connected to a motor.

8. The amphibious flying car according to claim 1, characterized in that: under the control of the hydraulic rigid mechanical operating system, a rotation shaft of said rotor wing (5) tilts backwards in a range of 0.5°-3°.

9. The amphibious flying car according to claim 8, characterized in that: the chassis (12) of said amphibious flying car is further provided with an emergency sheltering device (21); said emergency sheltering device (21) comprises a storage battery and a motor, the storage battery is electrically connected to a motor.

10. The amphibious flying car according to claim 1, characterized in that: each of the two vertical fins (7) tilts outwards at a degree of 3°, and is provided with a rudder (17) and a navigation light (20).

11. The amphibious flying car according to claim 10, characterized in that: the chassis (12) of said amphibious flying car is further provided with an emergency sheltering device (21); said emergency sheltering device (21) comprises a storage battery and a motor, the storage battery is electrically connected to a motor.

12. The amphibious flying car according to claim 1, characterized in that: a coupler (4) is arranged between the drive system of said automobile engine (1) and the drive system of the aero-engine (8).

13. The amphibious flying car according to claim 12, characterized in that: the chassis (12) of said amphibious flying car is further provided with an emergency sheltering device (21); said emergency sheltering device (21) comprises a storage battery and a motor, the storage battery is electrically connected to a motor.

14. The amphibious flying car according to claim 1, characterized in that: a front face of said casing (3) is provided with an air inlet (19) of the automobile engine, and a rear portion of a side face of the casing (3) is provided with an inlet passage (18) of the aero-engine.

15. The amphibious flying car according to claim 14, characterized in that: the chassis (12) of said amphibious flying car is further provided with an emergency sheltering device (21); said emergency sheltering device (21) comprises a storage battery and a motor, the storage battery is electrically connected to a motor.

16. The amphibious flying car according to claim 1, characterized in that: said operating system (2) further comprises a navigation system, a communication system and/or a positioning system.

17. The amphibious flying car according to claim 16, characterized in that: the chassis (12) of said amphibious flying car is further provided with an emergency sheltering device (21); said emergency sheltering device (21) comprises a storage battery and a motor, the storage battery is electrically connected to a motor.

18. The amphibious flying car according to claim 1, characterized in that: the chassis (12) of said amphibious flying car is further provided with an emergency sheltering device (21); said emergency sheltering device (21) comprises a storage battery and a motor, the storage battery is electrically connected to a motor.

* * * * *